Patented Oct. 3, 1922.

1,431,081

UNITED STATES PATENT OFFICE.

GEORGE WILSON ACHESON, OF NEWARK, NEW JERSEY, ASSIGNOR TO ACHESON CORPORATION, OF NEW YORK, N. Y., A CORPORATION OF DELAWARE.

LAKE AND METHOD OF PREPARING SAME.

No Drawing. Application filed August 7, 1922. Serial No. 580,283.

*To all whom it may concern:*

Be it known that I, GEORGE WILSON ACHESON, a citizen of the United States, residing at Newark, in the county of Essex and State of New Jersey, have invented certain new and useful Improvements in Lakes and Methods of Preparing Same, of which the following is a specification.

This invention comprises a novel pigment material of the the so-called "lake" type, comprising an adsorptive base material and an adsorbed color or dye; and a novel method of preparing the same. The base material may be any of the usual lake bases such as alumina, stannic oxid, barium sulfate, etc., but I will describe the invention as applied to a lake having English china clay as the base. The dye may be any appropriate water-soluble color, such for example as those known to the trade as aniline red, blue or yellow, Merck.

According to this invention I first subject the china clay or other base material to a preparatory treatment by the procedure known as "deflocculation", such procedure involving, as is now well understood by those skilled in this art, the mechanical working of the base material in the form of a heavy paste in conjunction with certain organic bodies, such as tannin, extracts from roasted cereals, or other starchy materials, etc., known as deflocculating agents. This operation is facilitated by the addition of ammonia, or amino bodies such as hexamethylenetetramine.

The effect of this treatment is to bring about a further subdivision of a greater or less proportion of the clay particles, whereby they pass beyond the limits of visibility in an ordinary microscope and acquire the characteristics of the so-called colloidal substances, being permanently suspensible in pure water, but precipitated therefrom (flocculated) by the addition of electrolytes even in minute proportions. The entire mass, thinned with pure water to a creamy consistence, is now subjected to an operation having for its purpose the separation of the coarser from the finer particles. This may be accomplished by sedimentation in a series of tanks, or by any appropriate classifying system; but I prefer to use a thickener of the Dorr type, which yields as an effluent a suspension containing the whole of the deflocculated particles, together with such fine but non-deflocculated particles as may remain suspended under the particular conditions.

To this suspension I now add the dye or a solution thereof in concentration sufficient to give the desired color or tint; and I thereupon re-flocculate the base material by the addition of an appropriate electrolyte, as alum, hydrochloric acid, sodium carbonate, etc., using either an acid, neutral or alkaline electrolyte according to the nature of the base material and the dye.

The re-flocculated material will be found to have strongly adsorbed the coloring matter, and is readily separated from the water by subsidence or filtration. After drying it is ready for use as a lake pigment, in conjunction with any appropriate oily or other vehicle.

I claim:

1. Method of preparing a lake, comprising deflocculating a pigment base, and re-flocculating the same in presence of a dye, whereby the dye is adsorbed by the re-flocculated base.

2. Method of preparing a lake, comprising subjecting a clay material to a deflocculating operation, and thereafter re-flocculating the same in presence of a dye.

3. Method of preparing a lake, comprising subjecting a clay material to a deflocculating operation, separating the finer components including the deflocculated particles, and thereafter reflocculating the same in presence of a dye.

4. As a new composition of matter, a lake comprising re-flocculated particles carrying an adsorbed dye.

5. As a new composition of matter, a lake comprising re-flocculated clay particles carrying an adsorbed dye.

In testimony whereof, I affix my signature.

GEORGE WILSON ACHESON.